United States Patent [19]

Butler

[11] 3,865,492
[45] Feb. 11, 1975

[54] APPARATUS FOR USE IN ALIGNING WHEELS

[75] Inventor: Louis L. Butler, Baton Rouge, La.

[73] Assignee: Bear Manufacturing Corp., Rock Island, Ill.

[22] Filed: Nov. 19, 1973

[21] Appl. No.: 417,228

Related U.S. Application Data

[63] Continuation of Ser. No. 234,814, March 15, 1972, abandoned.

[52] U.S. Cl. ............... 356/155, 356/153, 356/152
[51] Int. Cl. ........................................ G01b 11/00
[58] Field of Search .......... 356/153, 152, 155, 156, 356/172; 250/221

[56] References Cited
UNITED STATES PATENTS

| | | | |
|---|---|---|---|
| 3,393,455 | 7/1968 | MacMillan | 356/155 X |
| 3,533,699 | 10/1970 | Hopkins et al. | 356/152 X |
| 3,603,688 | 9/1971 | Smith-Vaniz | 356/152 X |
| 3,612,881 | 10/1971 | King | 356/172 X |
| 3,667,846 | 6/1972 | Nater et al. | 356/156 X |

OTHER PUBLICATIONS

R. Barrett, J. of Physics E: Scientific Instruments, 1970, Vol. 3, pgs. 895–898.

*Primary Examiner*—Ronald L. Wibert
*Assistant Examiner*—Paul K. Godwin

[57] ABSTRACT

Toe measuring apparatus including a light projector unit and a photoelectric receiver suspended from a wheel clamp on each front wheel. Each projector projects a narrow vertical beam parallel to the wheel axis and onto the opposite receiver. Each receiver comprises a pair of photosensitive elements which are partially shaded and connected to provide a readout in accordance with the zone of impingement of the incident beam to indicate the toe angle of the opposite wheel.

20 Claims, 19 Drawing Figures

PATENTED FEB 1 1 1975 3,865,492

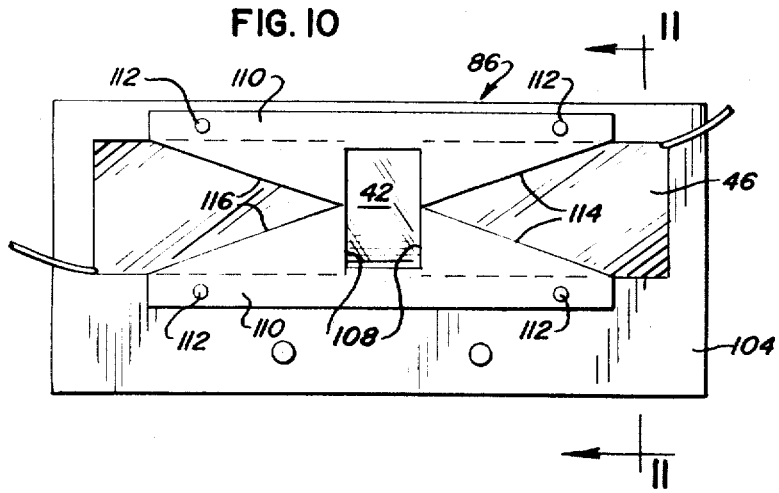
FIG. 10
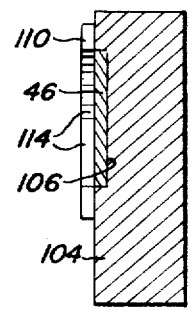
FIG. 11
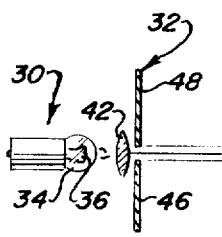
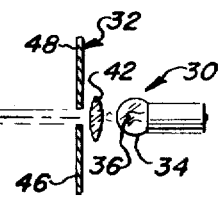
FIG. 17
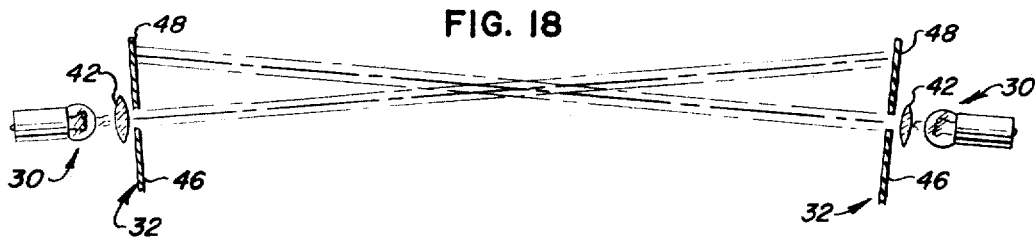
FIG. 18
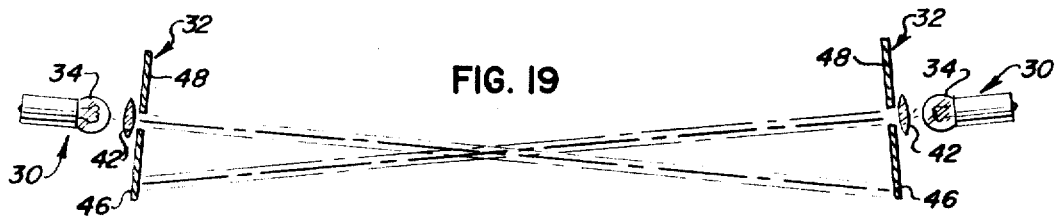
FIG. 19

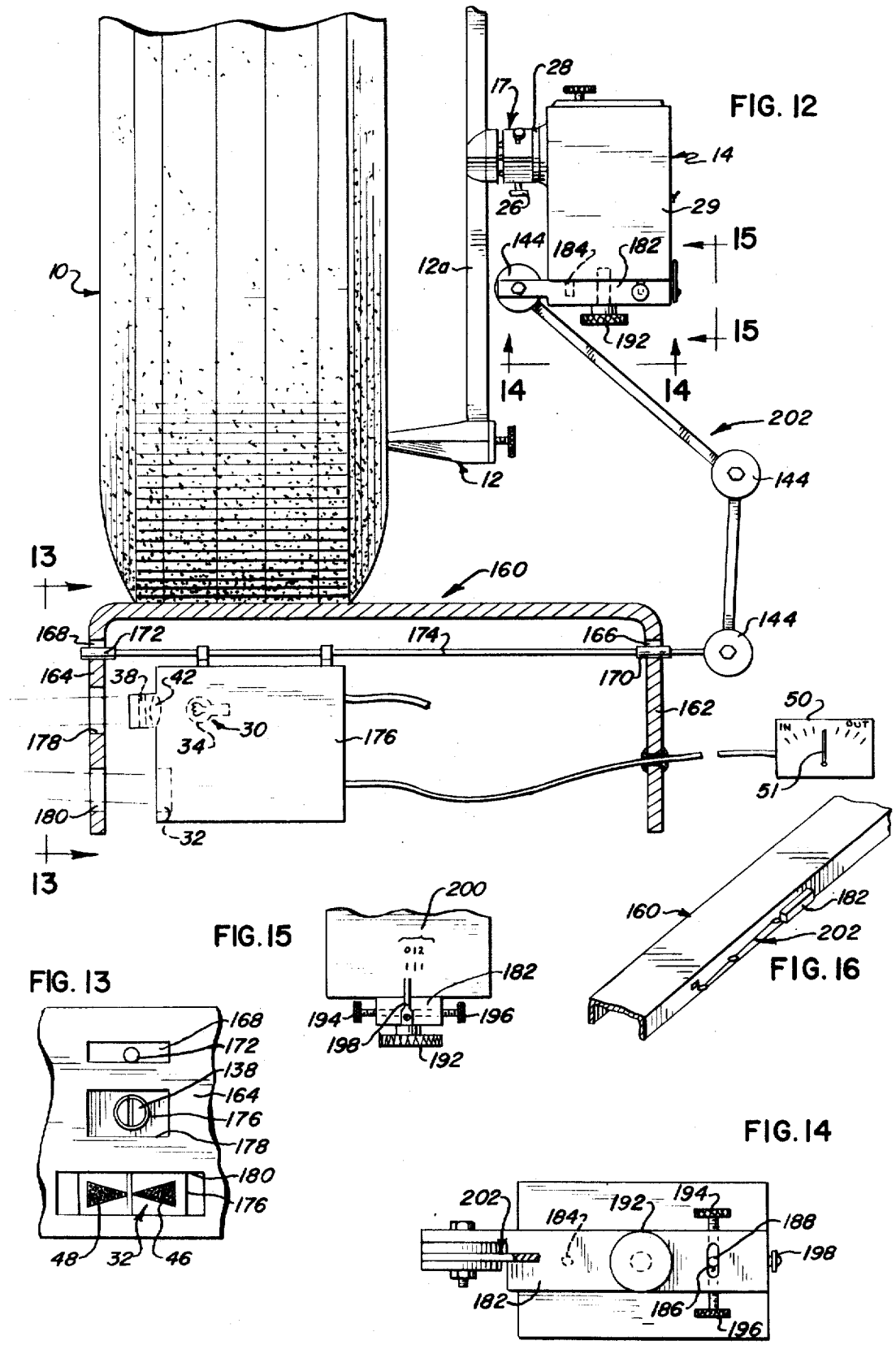

APPARATUS FOR USE IN ALIGNING WHEELS

This is a continuation, of application Serial No. 234,814 filed Mar. 15, 1972, now abandoned.

This invention pertains to improvements in apparatus for use in aligning wheels on automotive vehicles, and particularly to apparatus utilized in measuring the toe angle.

Toe angle is a measure of the parallelism, or deviation from parallel, of opposed wheels, particularly steerable wheels, of a vehicle when in a nominally straight-ahead position. This angle is an important factor in tire wear as well as in the steering condition or steering stability of the vehicle.

Various arrangements have been proposed for use in measuring the toe angle of the wheels of automotive vehicles. Such devices have included, among others, mechanical linkage devices, optical telescope and target arrangements, apparatus designed to measure the distances between reference points on the wheels, apparatus for measuring the angle of deviation between a reference device extending between the wheels and a reference plane of the wheels, and arrangements for projecting light beams between apparatus attached to each of a pair of wheels. The latter types of devices have taken the form of projecting a scale image from one device onto a screen of a device on the opposite wheel, with the screen bearing a reference line. Other arrangements have been to provide a scale on the screen and optically project a reference line from the opposite device onto the screen for comparison with the reference marks.

Prior devices of the various types referred to above exhibit various problems and shortcomings in use. Some of these devices inherently rely upon a readout by the operator at the measuring station, such as in reading a mechanical scale, or in reading a reference line against a scale on a screen in the optical projection type devices. Ambient light also can make it difficult to observe and accurately read the indications in projected image devices. Apparatus which requires the connection of measuring devices or sensing devices between a pair of wheels presents obvious disadvantages by way of requirements for operator movement from station to station, avoiding intervening obstacles and the like. Also, various prior types of apparatus required precompensation for other angles of the wheel system, such as the camber angle, before accurate measurements can be made of the toe angle.

A primary requirement for apparatus for measuring the toe angle of automotive wheels is that of accuracy. Other important desirable characteristics include simplicity and convenience in applying the apparatus to successive vehicles and in obtaining the readings after the apparatus is applied, to avoid expenditure of excessive time by the operator, and attendant costs. The apparatus should not require recalibration for each use and should minimize or avoid any requirement for careful visual alignment by the operator in each successive use, and should avoid the necessity of adjusting the device to accommodate each particular wheel position, e.g., camber angle, of each individual vehicle. The readout of the toe angle being measured should be presented in a position where it can be observed conveniently by the operator, as well as by the customer. Moreover, the readout should be easily readable without regard to ambient light levels.

It is an object of this invention to provide improved apparatus for use in the alignment of wheels of automotive vehicles and which overcomes problems of the prior art and affords the desirable characteristics referred to above.

It is another object of this invention to provide wheel alignment apparatus for accurately and reliably measuring the toe angle of wheels on automotive vehicles.

It is another object of this invention to provide improved apparatus of the type indicated wherein a predetermined desirable reference condition between a pair of wheels can be established independently of the distance between the two wheel units.

It is another object of this invention to provide improved apparatus of the type indicated in which the readout of the sensing mechanism may be displayed for convenient observation by the operator and/or by the customer.

It is a further object of this invention to provide apparatus for measuring toe angle which avoids requirements for compensating adjustments due to other alignment characteristics of the wheels such as camber.

It is another object of this invention to provide apparatus for measuring toe angles and which is adjunctive to apparatus for measuring other alignment values, and particularly to provide an arrangement whereby the toe measuring components may be brought into operation readily and conveniently in conjunction with such other apparatus.

It is a further object of this invention to provide apparatus of the indicated type which is integrated with a support assembly for the vehicles.

It is another object of this invention to provide improved apparatus meeting the aforestated objects and which is of simple, rugged design, affords rapid toe measurements and is reliable and accurate in operation.

In carrying out this invention in one illustrative form, toe angle measuring apparatus is provided comprising an optical projection system which is suspended on a wheel of an automobile in a reference position to project a narrow beam from a position adjacent the first wheel toward a target suspended on the opposite wheel, with the projection being along an axis parallel to the axis of rotation of the first wheel. The target includes a pair of photosensitive elements connected to an indicator means, with the two photosensitive elements positioned and designed to provide outputs indicative of the position in which the light beam impinges upon the receiver. In one advantageous embodiment, the light projection and photosensitive elements are supported in a vehicle lift rack assembly in a manner to be freely movable longitudinally of the rack, with detachable connector arms for connecting each projector-receiver assembly to alignment apparatus attached to the wheel and positioning the projector-receiver assembly parallel to the axis of rotation of the wheel.

For a more complete understanding of this invention reference should now be had to the embodiments illustrated in greater detail in the drawings and described below by way of examples of the invention.

In the drawings, FIG. 1 is a schematic elevation view of the front wheels of an automobile with apparatus employing teachings of this invention suspended from the wheels;

FIG. 10 is a front view of the receiver subassembly of the apparatus in FIG. 5;

FIG. 11 is a sectional view taken along line 11—11 of FIG. 10 and looking in the direction of the arrows;

FIG. 12 is a view similar to FIG. 5 and illustrating another embodiment employing teachings of this invention;

FIG. 13 is a partial side view, taken generally along line 13—13 of FIG. 12 and looking in the direction of the arrows;

FIG. 14 is a bottom view of the sensing head and mounting subassembly, taken generally along the line 14—14 of FIG. 12 and looking in the direction of the arrows;

FIG. 15 is a partial side view, taken generally along line 15—15 of FIG. 12 and looking in the direction of the arrows;

FIG. 16 is a schematic perspective view illustrating one manner of storing the connector subassembly of the apparatus of FIG. 12;

FIG. 17 is a schematic plan view of the light projectors and receiver units in an aligned position; and FIGS. 18 and 19 are views similar to FIG. 17 and illustrating the mechanism in toe out and toe in positions, respectively.

Figure 1:
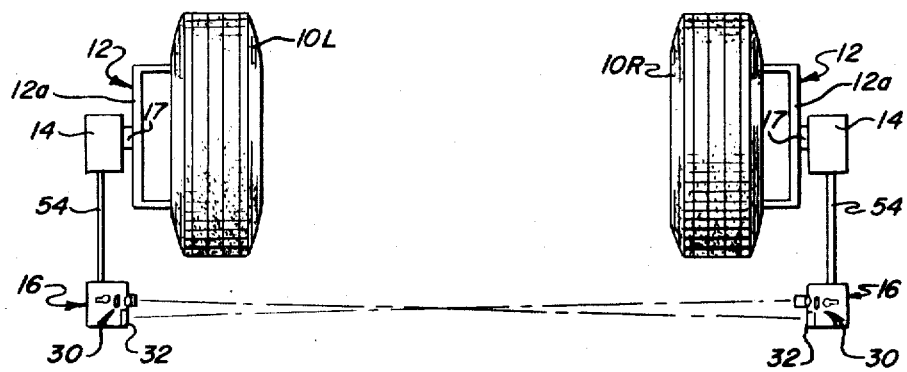

In the drawings, 10 indicates a wheel of an automotive vehicle, with the suffixes L and R applied wherever appropriate to designate a left front wheel and a right front wheel, respectively.

Figure 2:
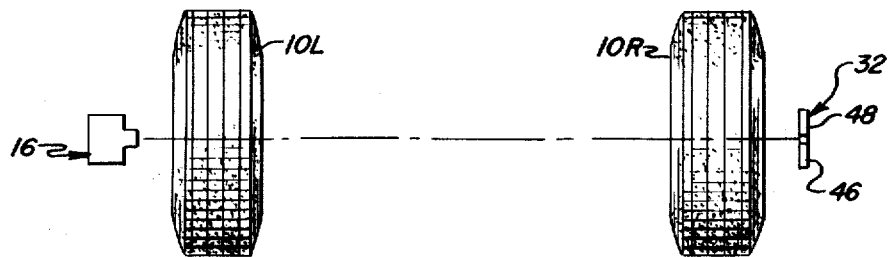
FIG. 2 is a schematic bottom view of the wheels of FIG. 1 showing one projector and one receiver of the measuring apparatus.

In FIGS. 1 and 2, the apparatus shown mounted on each wheel comprises a wheel clamp assembly 12, an adjustable checking head unit 14 pivotally and rotatably mounted on the respective clamp assembly, and a toe measuring unit 16 suspended on each of the heads 14. The illustrated wheel clamp assembly 12 is of the type having three mounting pins for clamping engagement with the outer bead of a wheel rim, to thereby provide a fixed mounting reference with respect to the wheel assembly and its axis of rotation. The wheel clamp assemblies may be of other appropriate design for attaching a checking head 14 to a wheel as described. The heads 14 also may be of any appropriate design, preferably including mechanism utilized in measuring other conditions of wheel alignment, such as camber and caster angles. By way of further example the components of each head 14 may comprise one or more gravity sensing electrolytic transducers as described in my copending application entitled "Apparatus For Determining Wheel Alignment," being filed herewith (Ser. No. 234,838, now abandoned, and parent application of Ser. No. 396,812, and/or one or more spirit level measuring devices for measuring such values.

Figure 5:
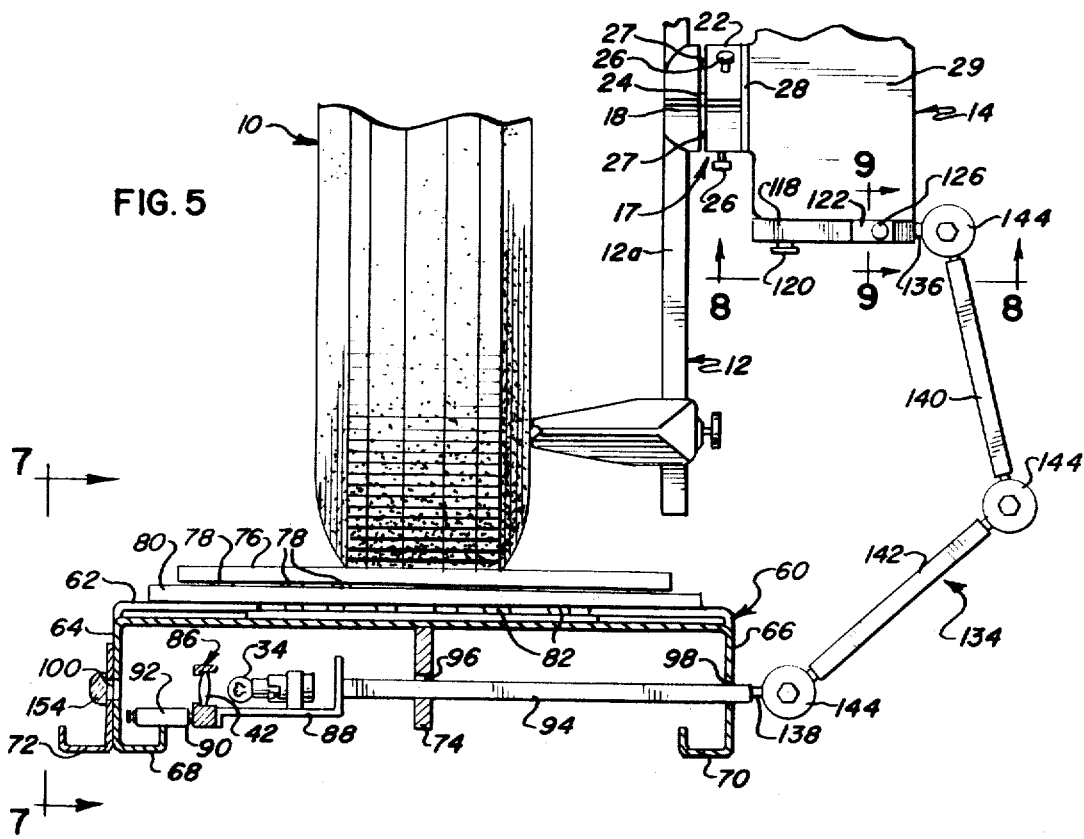
FIG. 5 is an elevation view, partially in cross section, taken along broken line 5—5 of FIG. 6 and showing another embodiment employing teachings of this invention.

The adjustable and pivotal mounting of each head unit 14 on the respective clamp assembly 12 also may be by any convenient construction. Referring for example to FIGS. 5 and 12, there is illustrated a compensator assembly 17 including a mounting block 18 affixed to the reference bar 12a, with a compensator block 22 resiliently secured to block 18 for rotation therewith as by spring mounting on three equiangularly disposed studs 24. Thumb screws 26 adjust the longitudinal positions of abutment studs 27 for adjusting the angular position of the block 22 relative to block 18, and thus relative to the wheel assembly 10. Head 14 is rotatably supported on a bolt (not shown) extending from block 22 through a bearing assembly 28 and an appropriate opening in the adjacent wall of housing 29 of the unit 14. The opposed surfaces of the block 22 and the housing 29 are firmly engaged against opposite sides of the bearing 28. This fixes the axis of rotational support of the head unit 14 relative to the wheel clamp 12, and thus relative to the respective wheel assembly 10, subject only to such selective angular adjustment as may be effected by adjusting the thumb screws 26. Each assembly 12 is positioned with the compensator unit aligned with the spindle of the respective wheel 10, whereby the axis of rotation of the unit 14 on the assembly 12 is essentially aligned with the axis of rotation of the wheel.

Figure 4:
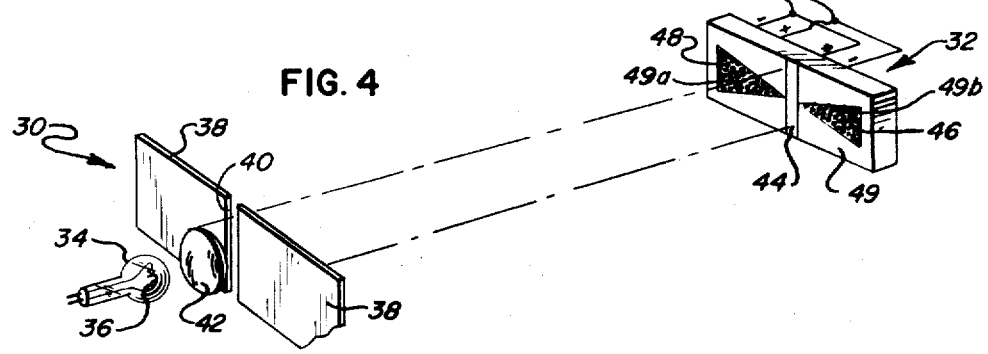
FIG. 4 is a schematic illustration of a photo-electrical system of the measuring apparatus of FIG. 1.

Referring now to FIGS. 1 and 4, each unit 16 includes a light projector assembly 30 and a receiver 32. Each assembly 30 includes a clear glass light bulb 34 having a filament 36 in the form of a vertical helix of substantial length and relatively small diameter. A pair of shields 38 are positioned in front of the bulb 34, and spaced to provide a narrow projection slot 40. A double convex lens 42 is positioned between the bulb 34 and the shields 38 in alignment with the slot 40, to focus the image of the filament 36 as a narrow light beam onto the receiver 32, as indicated by the rectangle 44. Receiver 32 includes two photosensitive elements 46 and 48, such as selenium photovoltaic plates. These plates are of the type to provide an electrical output signal directly related to the quantity of light energy impinging upon the respective plate. A masking plate 49 overlies the two plates 46 and 48, and has openings 49a and 49b of triangular configuration, with the points of the triangles spaced apart approximately the width of the projected light image 44.

The two plates 46 and 48 are connected to appropriate sensing and indicator means, such as a midpoint meter 50, in opposing relation to one another to deflect the meter indicator 51 in one direction from its midpoint upon photoactuation of one of the elements 46 and 48, and to deflect the indicator in an opposite direction upon photoactuation of the other element. With the narrow light beam centered between the V-shaped openings as illustrated, or overlapping the two openings in equal amounts, the meter indicator will remain at its midpoint or "zero" position. If the light source 30 is pivoted to move the projected image to the right or left, a greater potential will be provided by the plate element 46 or 48 onto which the light moves, thereby providing a corresponding indication on the meter 50.

It will be observed that the light image on the receiver 32 is of a width substantially less than the horizontal width of the exposed portion of each photosensitive element 46 and 48. Also, the light energy per unit area is essentially uniform throughout the area of the projected image. However, the vertical dimension of the area of an element 46 or 48 upon which the light beam impinges through the respective opening 49a or 49b will increase as the beam moves from the center of the receiver toward either outer edge, in accordance with the configuration of the openings. With triangular exposed areas as illustrated, this variation of area is in linear relation to the distance of the image from the center position. Thus, as the angular position of the light source 30 is changed, causing the image 44 to move to the right or left on the target 32, the output from the photosensitive elements will vary in accordance with the displacement of the beam image from the center position. Accordingly, a direct readout may be obtained on meter 50 of the change in angular position of the axis of the projector unit 30.

Referring again to FIGS. 1 and 2, each compensator 17 is adjusted as the wheel is rotated, to obtain a steady reading on a level sensing device in the unit 14. This compensates for "run out" or variations in the wheel, in a known manner, so that the mounting axis or axis of rotation of the unit 14 on the wheel clamp 12 is parallel to the axis of rotation of the respective wheel. The wheel is then positioned with the reference bar 12a vertical, and with the weight of the vehicle on the wheel. This insures that the axis of rotational support of the unit 14 on the assembly 12 is in a vertical plane through the axis of rotation of the wheel. Each head 16 is suspended as a pendulum on the respective unit 14 by a mounting arm 54. The arm 54 maintains the unit 16 in a position such that the axis of projection of each light source is parallel to the axis of rotation of the respective head 14 on the wheel clamp 12 and thus parallel to the axis of rotation of the respective wheel. Moreover due to the pendulum suspension, each unit 16 will inherently assume a position directly beneath the respective unit 14. Thus the axis of projection of the unit 16 also will be in vertical alignment with the axis of rotation of the wheel.

The axes of rotation of the front wheels of an automobile are essentially colinear at zero toe angle, i.e., each wheel in straight ahead position (except for exceptional instances, such as a bent frame resulting from an accident). Accordingly, the two noted vertical planes of the wheel axes and the respective projectors 30 will be coincident, with each light beam being centered on the receiver 32 of the opposite unit 16 at zero toe angle, as illustrated schematically in FIG. 17. If a wheel is in a toe out condition, the beam from the light source 30 attached to that wheel will strike the opposite receiver 32 at a point on a plate 48 displaced from the center area in proportion to the angle of toe out and the distance between the light source and the receiver. For instance, FIG. 18 illustrates schematically the position of the two units where both wheels are in a toe out position (the front of the vehicle is towards the top of the drawing). Similarly, at toe in angles, each light beam will impinge upon the other photocell 46 of the receiver at a point displaced from the center point in proportion to the angle of toe in and the distance between the light source and the receiver as seen in FIG. 19.

It will be appreciated that the readout circuitry and meter may have a variable calibration element for adjustment in accordance with the wheel spacing of the vehicle. Alternatively, the circuitry can be calibrated to a standard wheel width, with interpolation, as by appropriate tables or calculation, when testing an automobile of a different wheel spacing.

Thus, with the described units 16 mounted as described, the toe angles of the wheels may be read directly from meters 50, and be accurately adjusted with respect to those meters. Moreover, the meters may be placed in any suitable and convenient locations.

One advantage of the illustrated apparatus is that the center reference or zero position illustrated in FIG. 17 is independent of the spacing between the light sources 30 and targets 32, and thus independent of the wheel spacing. Accordingly, the toe angle of a vehicle may be calibrated to a desired value without regard to the wheel spacing by first presetting each of the units 16 at the desired toe angle to the axis of rotation of the respective wheel, and then adjusting the wheels until the toe measuring mechanism is aligned as in FIG. 17. At that point the wheels will be at the predetermined desired toe angle. Specific examples of apparatus for effecting such a predetermined setting will be discussed below with respect to the embodiments of FIGS. 5 and 12.

By mounting the units 16 to extend toward the planes of or beneath the wheels, the receivers 32 are near the steering axis of each wheel. Accordingly, the displacement of the receiver from the desired reference positions at various toe angle settings is minimized. Moreover, the small angles involved and the magnification factor of projection across the width of the automobile also reduce the significance of any such displacement of the receivers.

FIGS. 5–11 illustrate a preferred embodiment of the invention incorporated in a lift rack assembly such as is often utilized at wheel alignment stations. Only one trackway 60 and associated toe angle measuring mechanism is illustrated in these drawings, it being understood that a corresponding track and corresponding toe measuring mechanism also are provided at the opposite side of the vehicle, with the two angle measuring mechanisms cooperating as described above with respect to the embodiment of FIGS. 1–4.

Figure 6:
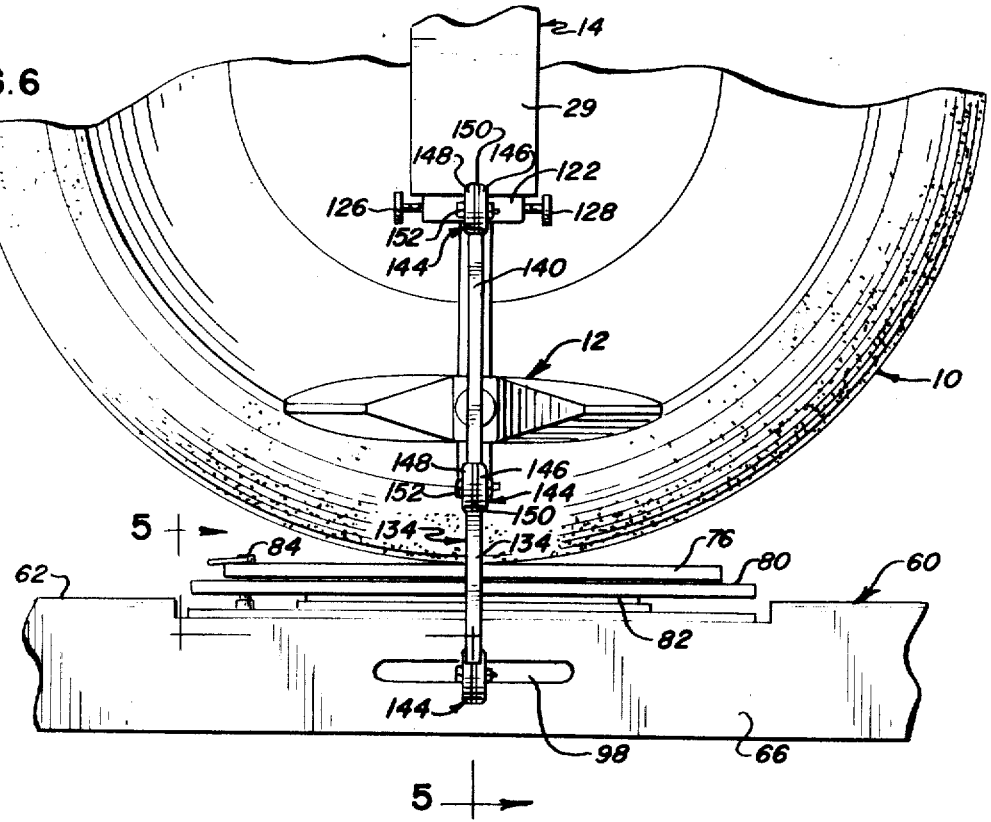
FIG. 6 is a side view of the apparatus shown in FIG. 5.
Figure 7:
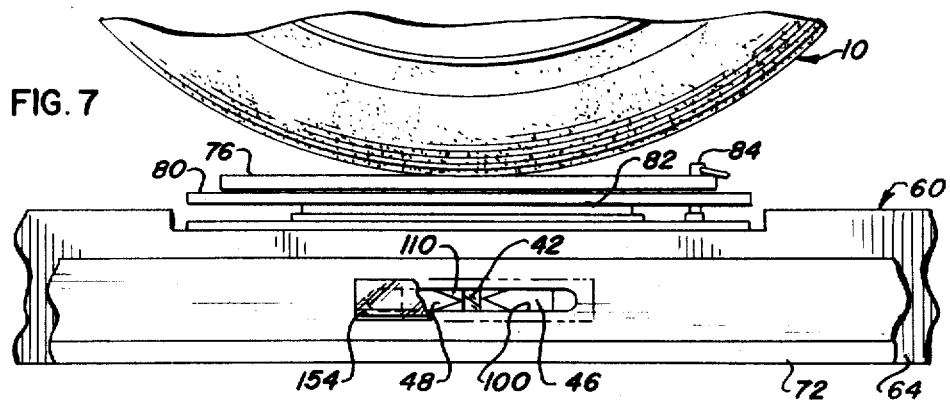
FIG. 7 is a side view, taken generally along the line 7—7 of FIG. 5 and looking in the direction of the arrows.

The illustrated rack 60 is basically channel-shaped, including the vehicle supporting web 62 and a pair of downwardly extending outer flanges 64 and 66, each provided with a return bent flange section 68, 70 at its lower edge. A J-shaped reinforcing flange 72 extends along the inner flange 64. A support bracket 74 extends downward from the midarea of the web 62. Referring also to FIG. 6, during checking and adjustment of the alignment of the front wheels, those wheels preferably are positioned on turning radius plates 76 which are rotatably journaled by bearings 78 atop support plates 80 mounted on bearing rollers 82 for relatively free movement transverse to the trackways 60. A locking pin 84 is provided for locking the plates 76 and 80 in a predetermined position on the rack 60 as desired. The relative movement permitted by the plates 76 and 80 assures easy movement of the wheels during the alignment procedures to avoid erroneous readings as might otherwise be introduced because of forces generated by the frictional engagement of the lower surfaces of the tires with fixed support surfaces.

In this embodiment, a light bulb 34 and a combination lens-photocell unit 86 are supported within the cavity defined by the trackway 60. As seen in FIG. 5, the light bulb 34 is mounted on a bracket 88 which is attached to the unit 86. A shaft 90 extends from the opposite side of the unit 86 through a roller 92 which has rolling engagement with the distal edge of flange 68 for supporting the outer end of the assembly. A square tubular support member 94 is attached to bracket 88 and extends through an elongated slot 96 in support bracket 74 and an aligned slot 98 in the flange 66. A similar slot 100 is provided through the flange 64 and the flange 72 in axial alignment with the light source. Each of the described slots is elongated horizontally, as illustrated by slots 98 and 100 in FIGS. 6 and 7 to permit lateral movement of the assembly as described below.

Referring to FIGS. 10 and 11, the unit 86 includes a mounting block 104 having shallow recesses 106 for receiving the sensitive plates 46 and 48. The plates are positioned to leave a narrow aperture 108 therebetween. The lens 42 is mounted directly behind this aperture. Thus, the aperture 108 serves both as the aperture for shaping the light beam directed at the similar receiver unit 86 mounted at the opposite wheel station and as the center or "zero" target area for the light beam projected from that opposite unit. A cover plate or plates 110 are secured to the front surface of the block 104, as by screws 112, to clamp the plates 46 and 48 in position. As shown in FIG. 10 these plates define opposed V-shaped openings 114 and 116 in alignment with one another and each having its apex at the edge of the lens aperture 108.

Figure 8:
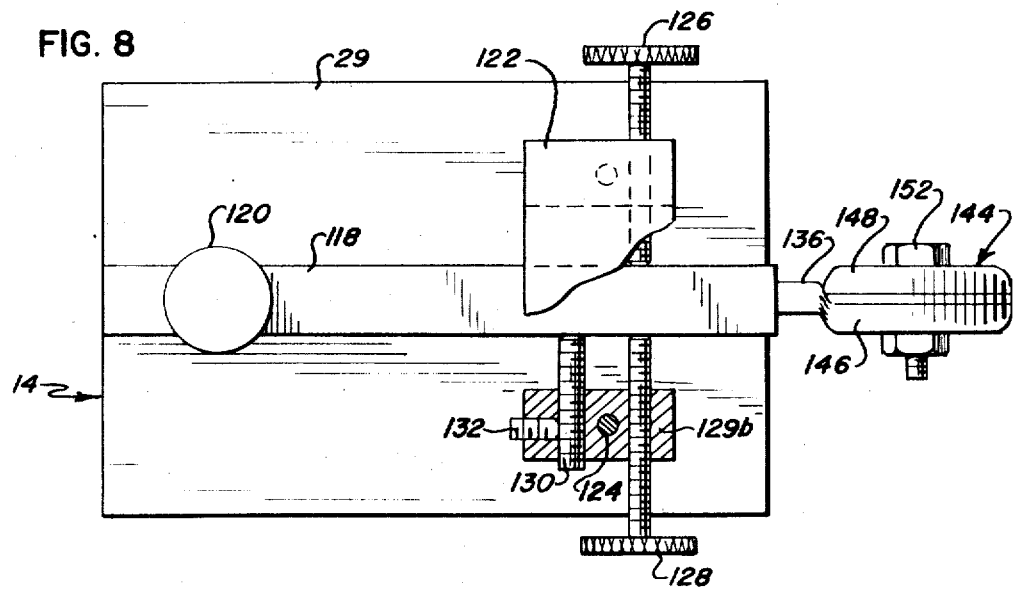
FIG. 8 is a bottom view of the sensing head subassembly, taken generally along the line 8—8 of FIG. 5 and looking in the direction of the arrows.
Figure 9:
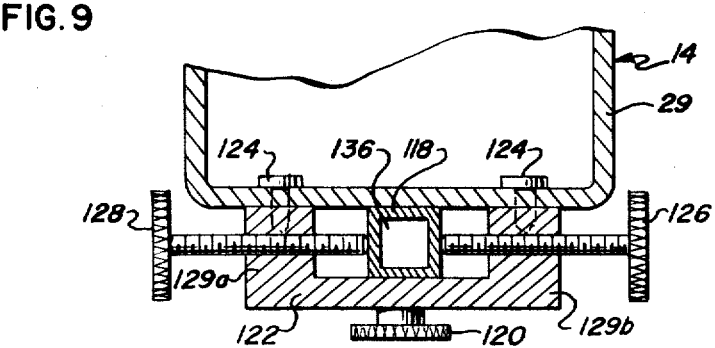
FIG. 9 is a partial sectional view taken along line 9—9 of FIG. 5 and looking in the direction of the arrows.

Referring to FIGS. 5, 8 and 9, a short hollow tubular member 118 is attached to the underside of the checking head 14, along the center line of the unit 14 and essentially parallel to the axis of rotational support of this unit on the compensator 17. The member 118 is mounted in a manner to permit setting of a predetermined toe angle value, as referred to above. To this end, a shouldered stud 120 extends through an appropriate opening in one end of the bar 118, and is threaded into the underside of the housing 29 of unit 14 to pivotally mount the inner end of the bar. The outer end of bar 118 is received in a U-shaped support 122 which is secured to the housing 29, as by screws 124. A pair of thumb screws 126 and 128 extend through the vertical legs 129a and 129b of the support 122 and abut the opposite sides of the bar 118 for selective angular adjustment of the bar relative to the unit 14. Referring particularly to FIG. 8, a further adjustment screw 130 is provided on the side of the bar 118 which would correspond to a toe out setting, and is preadjusted and locked at a zero toe angle position by a locking screw 132. The screw 130 is included as a safety measure against inadvertently setting the bar 118 for a toe out angle when arranging the illustrated apparatus for a predetermined toe setting as described above.

An articulated connector linkage 134 connects the checking unit 14 and the toe angle sensing unit. The linkage 134 comprises a square bar 136 for mating telescopic engagement in member 118, another square bar 138 for similar telescopic mating engagement in the member 94, and a pair of rigid interconnecting links 140 and 142. The bars 136 and 138 and links 140 and 142 are joined by connectors 144, each designed to permit folding angular adjustment of the connected elements in one predetermined plane, without permitting relative movement transverse to that plane. By way of example, each connector 144 includes a large plate-like element 146 rigidly joined to one link at the respective joint, an opposing plate-like element 148 rigidly joined to the other link connected to the same joint, a large brass bearing washer 150 between the opposing surfaces of these plate-like elements, and a pivot bolt 152 which maintains this subassembly in snug face-to-face abutting relationship. Such a subassembly permits the aforementioned angular adjustment about the axis of bolt 152, without permitting relative movement transverse to the plane of the washer 150. The mating engagements of the square bars 136 and 138 in the components 94 and 118 insure the maintenance of the indicated coplanar arrangement between the linkage 134 and the connected components. Thus, with the linkage 134 connected between the members 94 and 118, the toe sensing unit 34, 86 is connected to the sensing head 14 in a manner to maintain the projection axis of the unit 34, 86 in a plane parallel to the reference pivot axis of the head 14.

The toe sensing unit 34, 86 is freely movable longitudinally of the rack along slots 96 and 98 and over the surface of flange 68. Thus, the unit 34, 86 is freely movable to preserve the pendulum action of the sensing head 14 to remain in the vertical plane through the sensing head axis. The noted vertical alignment is further enhanced in that the slot 98 is of a vertical depth only sufficient to permit free lateral sliding movement of the bar 94, and precludes rotational movement of that bar in the slot. Vertical positioning of the entire unit also can be checked by an appropriate level sensing device in the head 14, if desired.

In operation, a pair of toe measuring units as illustrated in FIGS. 5–11 function in the same manner described above with respect to the embodiment of FIGS. 1–4. In addition, it will be appreciated that this unit is permanently housed in the lift rack 60. This rack may be on a hoist mechanism, or may be a permanent floor fixture on which the vehicle is positioned for checking its alignment. Moreover, the simple telescopic mating engagement of the bars 136 and 138 with the elements 118 and 94 permit quick and simple disconnection and reconnection of the toe measuring unit 34, 86 to the checking head 14. Thus, the head 14 may be utilized for measuring camber, caster or other angles in a normal manner during part of the alignment procedure, with the toe sensing unit 34, 86 being quickly connected for checking the toe angle.

Thumb screws 126 and 128 may be calibrated for setting preselected toe angles, if desired.

The vertical height of the light beam projected from a source 30 to a receiver 32 or 86 may be of a vertical dimension significantly greater than the vertical height of the photosensitive units 46 and 48, such as to avoid any necessity for careful alignment of the units vertically. This light beam may be concentrated for increasing the sensitivity and output of the photosensitive units by positioning an elongated lens or "magnifying" strip 154 over the slot 100 as shown in FIG. 5 and by dashed lines in FIG. 7. Such a device will concentrate a greater amount of the light energy on the photosensitive plates without changing the width of the light beam and thus without adversely affecting the accuracy.

Figure 3:
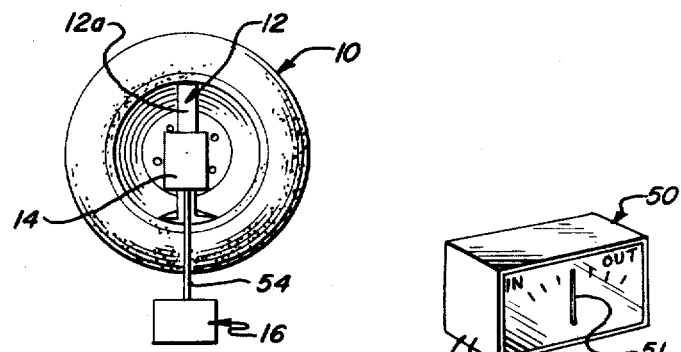
FIG. 3 is a side view of the assembly of FIG. 1.

The embodiment illustrated in FIGS. 12-15 includes superposed light source and target components similar to those disclosed in FIGS. 1-3, in a trackway assembly similar to the embodiment of FIGS. 5-11. Again, a single unit is shown on one wheel, it being understood that a corresponding unit is provided at the opposite wheel.

In FIG. 12, the rack 160 includes downwardly extending flanges 162 and 164 provided with elongated slots 166 and 168 for receiving rollers 170 and 172 of the support bar 174. The light source subassembly 30 and receiver unit 32 are mounted in a single housing 176 pivotally suspended from the bar 174 as illustrated. Elongated slots 178 and 180 are provided in the flange 164 for projection and reception passage of the light beam of the respective units 30. The various slots 166, 168, 178 and 180 are of sufficient length to permit the requisite adjustment of the supports and of the light source and receiver longitudinally of the rack in accordance with the toe angle of the wheel unit 10.

Referring to FIGS. 12 and 14, the connecting and adjusting arrangement on the base of the checking unit 14 in this embodiment comprises a bar 182 provided with a circular recess for pivotal engagement on a stud 184 projecting downward from the underside of the housing 29 of unit 14. At a spaced position, near its forward end, bar 182 is provided with a slot 186 for lateral sliding engagement with a second stud 188 projecting downward from the support housing 29. A thumb screw 192 extends through the bar 182 and is threaded into the underside of the housing 29 for supporting the bar 182 on the housing. Lateral angular positioning of the bar 186 for setting preselected toe angles is provided by a pair of thumb screws 194 and 196 which are threaded laterally through the bar 182 and abut the fixed stud 188. It will be appreciated that appropriate adjustment of these screws will adjust the angular position of bar 182 about the pivot point of stud 184, and lock the bar in any preselected position, within the ambit permitted by the length of slot 186.

A pointer 198 may be provided on the outer end of the bar 182 for correlation with indicia 200 on the outer end of the support housing as a reference for presetting the bar 182 for predetermined toe angles.

An articulated linkage 202 joins the inner end of bar 182 with the outer end of rod 174. The linkage 202 is designed to permit folding articulation in a predetermined plane, without permitting relative rotation between the components transverse to that plane, in the same manner referred to above in discussing linkage 134. The toe measuring components are readily disconnected from the head 14 by simply unscrewing thumb screw 192, and removing the bar 182 from housing 29. The linkage components may be stored conveniently by securing them in clips along the side of the rack as illustrated schematically in FIG. 16. Concomitantly, these units may be reconnected by the simple expedient of repositioning the bar 182 on the studs 184 and 186, and securing the thumb screw 192, for subsequent measurements.

In the embodiments of FIGS. 5-16 the two light projector units and receiver units are at predetermined spacings regardless of variations in the wheel spacings of the vehicles being tested. The articulated connecting linkages 134 and 202 provide the desired connections and alignment with the respective wheels regardless of the positions of the wheels across the width of the rack supports. Also, the projector and receiver components are disposed beneath the wheels and in or very close to the steering axes. These factors facilitate accurate calibration of the units and accuracy of the measurements.

In each embodiment, flexibility is provided for utilizing the wheel clamp and checking head 14 in measuring other alignment values, with convenient connection of the illustrated apparatus for the toe angle measurements.

Various types of photosensitive devices may be utilized as units 46 and 48, such as photoconductive or photovoltaic units. Moreover, the meter 50 may be a milliammeter or galvanometer type device, or other appropriate indicator, in accordance with the type of photosensitive units and the circuitry utilized to sense the response of those units. However, shaded photovoltaic plates connected directly to a meter 50 provide a very simple design and is preferred. In one specific illustrative embodiment of the receiver unit, a pair of rectangular selenium photovoltaic plates were utilized successfully with a 12 volt, 20 watt BA 1215 clear glass light bulb. The photovoltaic plates were model S 100 LB units obtained from Vactec Inc. of Maryland Heights, Missouri, each plate being about 1-11/16 inches long and seven-eighths inch wide (vertical dimension as installed). The receiver unit was about 45 inches from the light source unit 30. A centerpoint milliammeter of a scale 250-0-250 milliamps was utilized, and an output of nearly 250 milliamps was indicated without the intensifier unit 154. By applying a bar 154 as a light collector a much greater output reading was available.

It will be appreciated that various types of light sources and compatible photoresponsive receiver units may be utilized for the projector and receiver devices in the aforedescribed apparatus. By way of a further specific example, for enhanced accuracy, each light projector may be of the laser type to project a laser beam to an appropriate receiver on the opposite sensing unit.

It will be apparent to those skilled in the art that other modifications and embodiments of the specific apparatus disclosed herein may be made without departing from the spirit and scope of this invention. Particular construction and fabrication details of several embodiments are disclosed only by way of example, and the various components may be fabricated and assembled in other configurations.

It will be seen that improvements have been provided which meet the aforestated objects.

While particular embodiments of this invention are shown and described herein, it will be understood, of course, that the invention is not limited thereto, since many other modifications may be made by those skilled in the art, particularly in light of the teachings herein. It is contemplated, theretore, by the appended claims to cover any such modifications as fall within the true spirit and scope of this invention.

What is claimed is:

1. Apparatus for use in aligning vehicle wheels comprising means for projecting a directional beam of light, means for attaching said projecting means to a first wheel for projecting said directional beam with the longitudinal axis of said beam in predetermined angular relationship to a line generally parallel to the axis of rotation of said first wheel, said line lying in a generally vertical plane through the axis of rotation of said first wheel, and photosensitive means positioned to intercept said beam when such axis of rotation is within a range predetermined positions, and means responsive to said photosensitive means for indicating the position of said axis of rotation relative to a predetermined reference position.

2. Apparatus as in claim 1 wherein said projecting means is positioned for projecting said beam parallel to the axis of rotation of said wheel.

3. Apparatus as in claim 1 wherein said attaching means includes means for engaging such a wheel, a support rotatably journalled on said engaging means and adjustable to have its axis of rotation parallel to the axis of rotation of the engaged wheel, said projecting means and said photosensitive means being suspended from said support.

4. Apparatus as in claim 3 wherein said projecting means and said photosensitive means extend toward the plane of such wheel from the suspension support.

5. Apparatus as in claim 1 wherein said attaching means includes means for engaging such a wheel, a support rotatably suspended on said engaging means, means for adjusting said support to position its axis of rotational suspension parallel to the axis of rotation of the engaged wheel, said projecting means and said photosensitive means being positioned beneath the position of such an engaged wheel, and means connecting said support to said projecting means and photosensitive means for positioning said projecting means and said photosensitive means along an axis parallel to said axis of rotational suspension.

6. Apparatus as in claim 5 including a wheel support, said projecting means and said photosensitive means being disposed in said wheel support.

7. Apparatus as in claim 1 wherein said photosensitive means provides a response signal which varies in accordance with the zone thereof on which said beam of light impinges.

8. Apparatus as in claim 1 wherein said photosensitive means comprises one photosensitive unit positioned to intercept said beam of light when said beam is on one side of a predetermined reference position, and another photosensitive unit positioned to intercept said beam of light when said beam is on the opposite side of such reference position.

9. Apparatus as in claim 8 wherein each of said photosensitive units is provided with an exposed area which varies in height with the distance from such reference position.

10. Apparatus as in claim 9 wherein each of said units is a photoresponsive plate, and a shield over said plate provided with a pair of spaced triangular openings.

11. Apparatus as in claim 10 wherein each of said units is a photovoltaic plate.

12. Apparatus as in claim 1 wherein said projecting means is adapted to project a beam of limited horizontal width, said photosensitive means affording an exposed photosensitive area of greater horizontal width than the width of said beam, and said exposed area varying in vertical height across its width.

13. Apparatus for use in measuring the toe of vehicle wheels comprising first and second sensing units, each of said units including means for projecting a directional light beam, means for supporting said units on opposed wheels of a vehicle with said projecting means of each unit projecting its directional beam toward the other of said units in predetermined angular relationship to a line generally parallel to the axis of rotation of said first wheel, said line lying in a generally vertical plane through the axis of rotation of the wheel on which the respective projecting unit is supported, and each of said sensing units including photosensitive means responsive in accordance with the position in which said beam projected by the other said sensing unit impinges thereon for indicating the position of said axis of rotation relative to a predetermined reference position.

14. Apparatus as in claim 13 wherein said supporting means for each of said units includes means for engaging such a wheel, a support rotatably journalled on said engaging means and adjustable to have its axis of rotation parallel to the axis of rotation of the engaged wheel, and said projecting means and said photosensitive means of each of said units being suspended from the respective support.

15. Apparatus as in claim 13 wherein said supporting means for each of said units includes means for engaging such a wheel, a support rotatably suspended on said engaging means, means for adjusting said support to position its axis of rotational suspension parallel to the axis of rotation of the engaged wheel, said projecting means and said photosensitive means of the respective units being positioned beneath the position of such an engaged wheel, and means connecting said support to said projecting means and photosensitive means for positioning said projecting means and said photosensitive means along an axis parallel to said axis of rotational suspension.

16. Apparatus as in claim 13 wherein said photosensitive means of each of said units provides a response signal in accordance with the zone thereof on which said beam of light projected by the other of said units impinges.

17. Apparatus as in claim 13 wherein said projecting means of each of said units is adapted to project a light beam of limited horizontal width and of a vertical height greater than the height of said photosensitive means of the other of said units, and each of said photosensitive means affording an exposed photosensitive area of greater horizontal width than the width of said beam projected by the other of said units, said exposed area varying in vertical height across its width.

18. Apparatus for use in aligning wheels of automotive vehicles comprising a support rack for supporting each front wheel of such a vehicle, first and second sensing units mounted in said rack with one of said units beneath the position assumed by each front wheel on said support rack, each of said sensing means including means for projecting a directional beam of light and photosensitive means responsive to such a beam received from the other of said units, means for positioning each of said sensing units with the axis of projection of such directional beam therefrom at a predetermined angle to a line generally parallel to the axis of rotation of said first wheel, said line lying in a generally vertical plane through the axis of rotation of the respective adjacent wheel and for positioning said photosensitive means of said unit to intercept said beam from the other of said sensing units, and means responsive to each of said photosensitive means for indicating the position of the received beam relative to a predetermined reference position.

19. Apparatus as in claim 18 wherein each of said sensing units is supported in said rack for horizontal adjusting movement, said positioning means including an articulated linkage for connecting each of said sensing units to an attachment assembly mounted on the respective superposed wheel.

20. Apparatus as in claim 18 wherein said means for positioning each of said sensing units includes a wheel clamp assembly attached to the respective front wheel, a support rotatably suspended on said clamp assembly and adjustable to have its axis of rotation parallel to the axis of rotation of such wheel, and an articulated linkage connected to said supports and to the respective sensing unit, said linkage permitting free adjustment movement of said support about its axis of rotation and maintaining the respective sensing unit parallel to said axis during such movement.

* * * * *